(12) United States Patent
Cheah et al.

(10) Patent No.: US 8,232,966 B2
(45) Date of Patent: Jul. 31, 2012

(54) MULTIPLE INPUT OPTICAL NAVIGATION SYSTEM

(75) Inventors: Chiang Sun Cheah, Penang (MY); Ak Wing Leong, Penang (MY); Yee Loong Chin, Perak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1090 days.

(21) Appl. No.: 12/132,554

(22) Filed: Jun. 3, 2008

(65) Prior Publication Data
US 2009/0295718 A1   Dec. 3, 2009

(51) Int. Cl.
*G09G 5/08* (2006.01)
(52) U.S. Cl. ........ 345/166; 345/156; 345/157; 345/163; 345/164; 345/165; 178/19.05; 250/221
(58) Field of Classification Search .......... 345/156–173; 178/19.05; 250/221
See application file for complete search history.

(56) References Cited

U.S. PATENT DOCUMENTS

| | | | |
|---|---|---|---|
| 4,751,505 A * | 6/1988 | Williams et al. | 345/166 |
| 5,786,804 A | 7/1998 | Gordon | |
| 6,525,306 B1 * | 2/2003 | Bohn | 250/221 |
| 7,071,923 B2 * | 7/2006 | Wang et al. | 345/166 |
| 7,358,963 B2 * | 4/2008 | Low et al. | 345/175 |
| 7,880,723 B2 * | 2/2011 | Lu | 345/166 |
| 2003/0020688 A1 * | 1/2003 | Norskog et al. | 345/158 |
| 2003/0184520 A1 * | 10/2003 | Wei | 345/163 |
| 2004/0046741 A1 * | 3/2004 | Low et al. | 345/166 |
| 2005/0179651 A1 * | 8/2005 | Ludwig | 345/156 |
| 2006/0007148 A1 * | 1/2006 | Theytaz et al. | 345/163 |
| 2007/0109152 A1 * | 5/2007 | Wald et al. | 341/31 |
| 2007/0222756 A1 * | 9/2007 | Wu et al. | 345/165 |
| 2008/0150896 A1 * | 6/2008 | Chang | 345/166 |
| 2008/0288205 A1 * | 11/2008 | Teoh et al. | 702/150 |

OTHER PUBLICATIONS

Avago Technologies, "ADNS-3060, High-performance Optical Mouse Sensor", Jan. 2007, p. 1-38.
Agilent Technologies, "ADNK-3061, Optical Mouse Designer's Kit", Nov. 8, 2004, p. 1-4.
Avago Technologies, "ADNS-3060, Optical Mouse Sensor", Sep. 16, 2006, p. 1-3.

* cited by examiner

*Primary Examiner* — Lun-Yi Lao
*Assistant Examiner* — Gregory J Tryder (57) ABSTRACT

An optical navigation system with optical imaging of multiple inputs using a single navigation sensor. The optical navigation system includes a tactile interface device, an image sensor, and a processor. The tactile interface device facilitates a navigation input. The image sensor intermittently generates images of a surface of the tactile interface device and images of a contact navigation surface. The image sensor also generates the images of the surface of the tactile interface device exclusive of the images of the contact navigation surface. The processor is coupled to the image sensor. The processor generates a first navigation signal based on the images of the tactile interface device and generates a second navigation signal based on the images of the contact navigation surface.

20 Claims, 8 Drawing Sheets

MULTIPLE INPUT OPTICAL NAVIGATION SYSTEM

BACKGROUND

Optical navigation sensors are conventionally used for surface navigation applications. For example, conventional optical navigation sensors are implemented in optical mouse devices for desktop computers. In surface optical navigation, the optical navigation sensor tracks the features of the navigation surface by generating and comparing several images of the navigation surface.

More recently, as computers have become more prevalent for the viewing of internet pages, long documents, etc., additional tactile interface controls such as the scroll wheel have been added to the conventional optical mouse components. The functionality of the scroll wheel serves to increase the user's ability to interface with the device. However, with the addition of the scroll wheel to the optical mouse, internal components are required to detect the user input to the scroll wheel. These components occupy internal space within the device and contribute additional factors for component failure. Although some conventional devices use a separate image sensor to detect a scroll wheel movement, the power requirements of the device are increased by implementing additional sensors. The cost of manufacture and assembly also increases with the integration of additional processing components.

SUMMARY

Embodiments of a system are described. In one embodiment, the system is an optical navigation system. The optical navigation system includes a tactile interface device, an image sensor, and a processor. The tactile interface device facilitates a navigation input. The image sensor intermittently generates images of a surface of the tactile interface device and images of a contact navigation surface. The image sensor generates the images of the surface of the tactile interface device exclusive of the images of the contact navigation surface. The processor is coupled to the image sensor. The processor generates a first navigation signal based on the images of the tactile interface device and generates a second navigation signal based on the images of the contact navigation surface. Other embodiments of the system are also described.

Embodiments of an apparatus are also described. The apparatus includes a first light source, a second light source, an image sensor, and a processor. The first light source illuminates a surface of a tactile interface device. The second light source illuminates a contact navigation surface. The image sensor generates separate navigation images of the surface of the tactile interface device and the contact navigation surface. The processor is coupled to the image sensor. The processor generates a first navigation signal based on the navigation images of the tactile interface device and generates a second navigation signal based on the navigation images of the contact navigation surface. Other embodiments of the apparatus are also described.

Embodiments of a method are also described. In one embodiment the method is a method for operating a multiple input navigation device. The method includes illuminating a surface of a tactile interface device. The method also includes activating an image sensor in a tactile interface device imaging mode to generate a first navigation image corresponding to the surface of the tactile interface device. The method also includes illuminating a contact navigation surface. The method also includes activating the image sensor in a contact navigation surface imaging mode to generate a second navigation image corresponding to the contact navigation surface. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
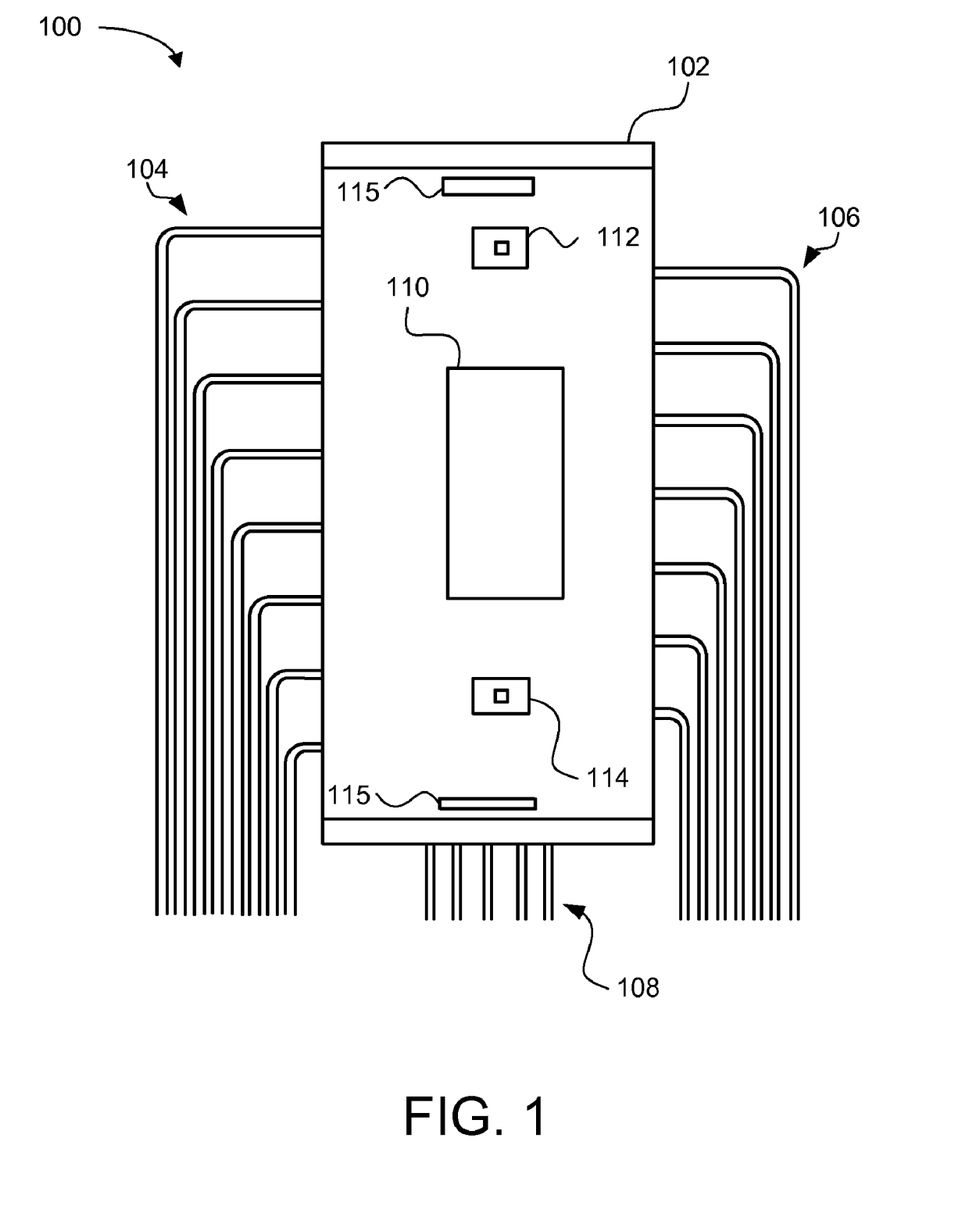
FIG. 1 depicts a schematic diagram of one embodiment of a sensor package for a multiple input optical navigation system.

FIG. 1 depicts a schematic diagram of one embodiment of a sensor package 100 for a multiple input optical navigation system. In the illustrated embodiment, the sensor package 100 includes a printed circuit board (PCB) 102. The PCB 102 includes electrical contact leads 104, 106, and 108. The electrical contact leads 104, 106, and 108 transport power and other signals to and from the PCB 102. The electrical contact leads 104, 106, and 108 are made of an electrically conductive metal.

The PCB 102 also includes a first light source 112 and a second light source 114. The light sources 112 and 114 may be activated exclusively (i.e. one at a time) or simultaneously. The light sources 112 and 114 may generate a light emission pattern based on a signal input to the PCB 102 via the electrical contact leads 104, 106, and 108. In one embodiment, the light sources 112 and 114 are light-emitting diodes (LEDs). In another embodiment, the light sources 112 and 114 are lasers. Other embodiments may include other types of light sources. In some embodiments, the light sources 112 and 114 are fabricated on the PCB 102. In other embodiments, the lights sources 112 and 114 are fabricated separate from the PCB 102 and then mounted and electrically connected to the PCB 102.

The PCB 102 of the sensor package 100 also includes an image sensor 110. In some embodiments, the image sensor 110 is a complimentary metal-oxide semi-conductor (CMOS) class sensor, although other embodiments include other types and classes of image sensors. The illustrated embodiment of the PCB 102 also includes mounting locations 115. The mounting locations 115 facilitate mounting a structure, for example, the aperture plate 122 of FIG. 2, to the PCB 102.

Figure 2:
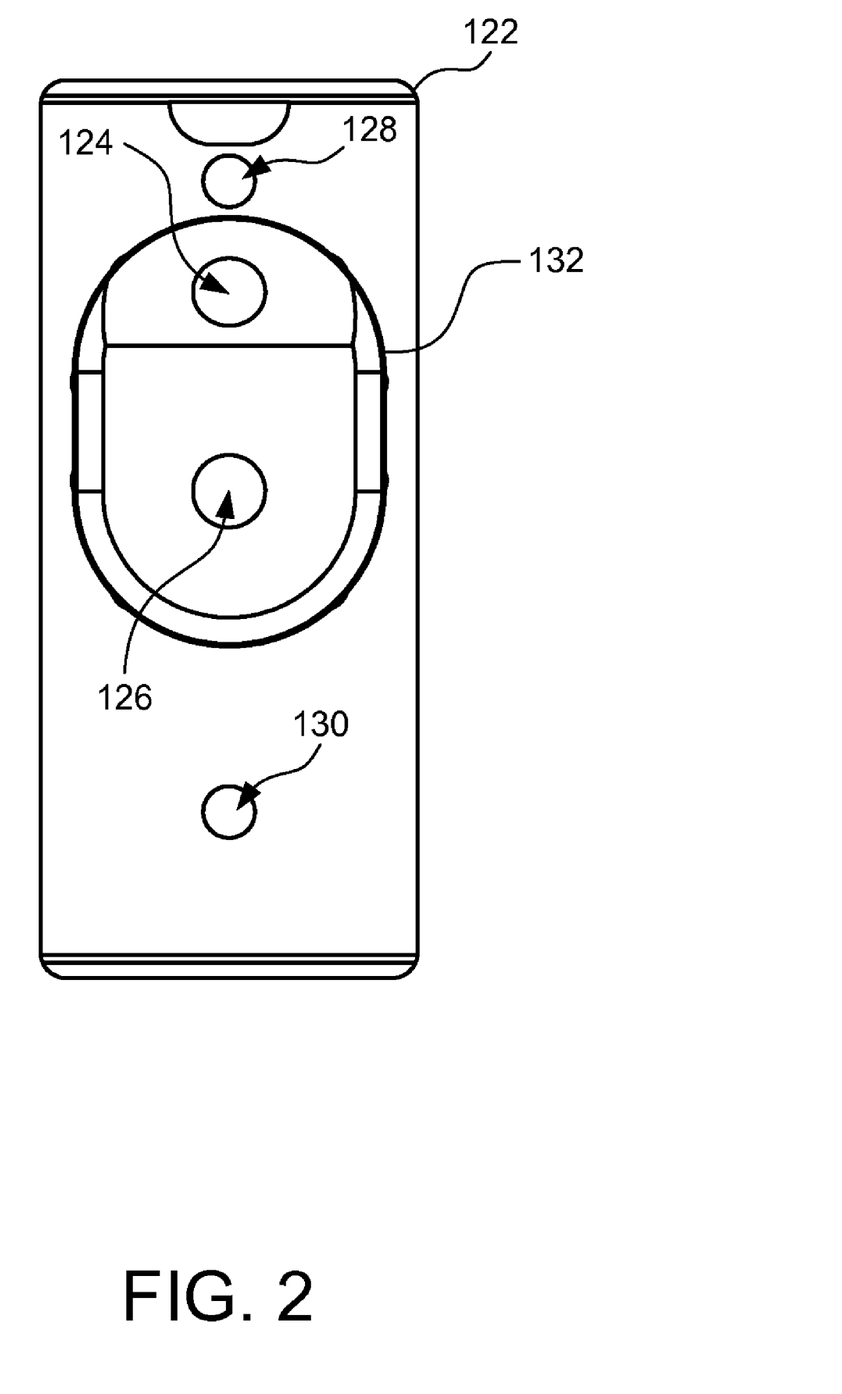
FIG. 2 depicts a schematic diagram of one embodiment of an aperture plate for the sensor package of FIG. 1.

FIG. 2 depicts a schematic diagram of one embodiment of an aperture plate 122 for the sensor package 100 of FIG. 1. In the illustrated embodiment, the aperture plate 122 includes a first light source aperture 128 and a second light source aperture 130. In some embodiments, the apertures 128 and 130 are holes through the aperture plate 122. In other embodiments, the apertures 128 and 130 are windows in the aperture plate 122 and are made of a light transmissive material.

The illustrated aperture plate 122 of FIG. 2 also includes a first image sensor aperture 124 and a second image sensor aperture 126. In some embodiments, the image sensor apertures 124 and 126 have a circular geometry. In other embodiments the image sensor apertures 124 and 126 have a non-circular geometry. In some embodiments, the image sensor apertures 124 and 126 remove aberrations from the light that passes through them. The aperture plate 122 also includes a raised structure 132. The raised structure 132 may be a raised portion of the aperture plate 122 that is raised some amount from the rest of the aperture plate 122. In some embodiments, this raised structure 132 defines a cavity on the other side of the aperture plate 122 to mount over the image sensor 110

Figure 3:
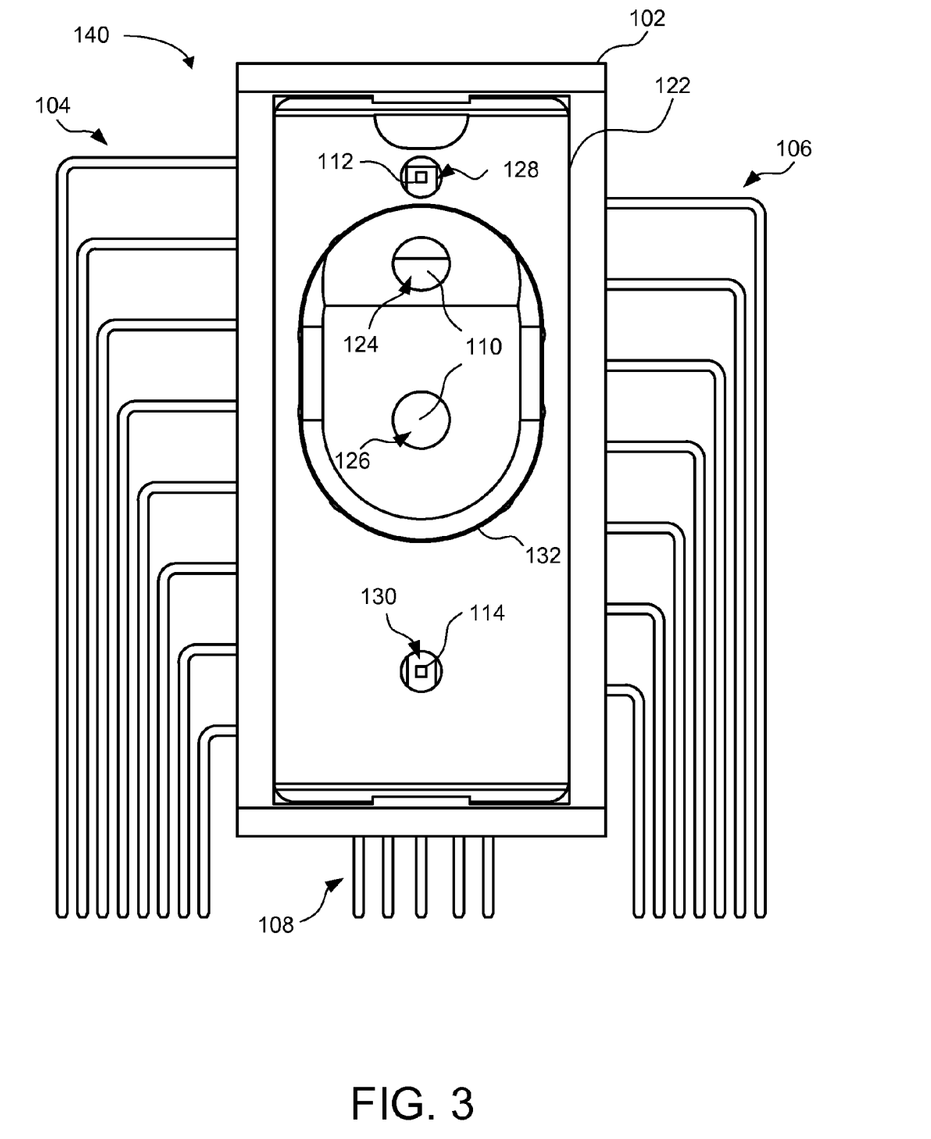
FIG. 3 depicts a schematic diagram of one embodiment of a multiple input optical navigation system with the sensor package of FIG. 1 and the aperture plate of FIG. 2.

FIG. 3 depicts a schematic diagram of one embodiment of a multiple input optical navigation system 140 with the sensor package 100 of FIG. 1 and the aperture plate 122 of FIG. 2. In the illustrated embodiment, the aperture plate 122 is mounted to the PCB 102. In particular, mounting tabs (not shown) on the aperture plate 122 are inserted in the mounting locations 115 of the PCB 102. Other embodiments include mounting the aperture plate 122 to the PCB 102 with adhesive. Another embodiment includes fasteners to mount the aperture plate 122 to the PCB 102.

The first light source aperture 128 is aligned with the first light source 112 to allow light from the first light source 112 to pass through the aperture plate 122. The second light source aperture 130 is aligned with the second light source 114 to allow light from the second light source 114 to pass through the aperture plate 122. In some embodiments, the first and second light source apertures 128 and 130 are aligned to allow a certain light distribution pattern to pass through the aperture plate 122. For example, the first and second light source apertures 128 and 130 may have a diameter to allow for a wider (e.g., greater than 45°) light distribution pattern from the first and second light sources 112 and 114 as the light passes through the aperture plate 122. In another embodiment, the first and second light source apertures 128 and 130 may have a diameter to allow for a smaller (e.g., less than 45°) light distribution pattern from the first and second light sources 112 and 114 as the light passes through the aperture plate 122.

The illustrated embodiment also includes first and second image sensor apertures 124 and 126. The first image sensor aperture 124 is aligned to allow reflected light from the first light source 112 to impinge on the surface of the image sensor 110, which is mounted to the PCB 102 within the cavity defined by the raised structure 132 of the aperture plate 122. In some embodiments, the first image sensor aperture 124 is aligned at some non-zero angle with respect to the PCB 102. The second image sensor aperture 126 is aligned to allow reflected light from the second light source 114 to impinge on the surface of the image sensor 110. In some embodiment the second image sensor aperture 126 is aligned approximately parallel to the PCB 102. In some embodiments, the first and second image sensor apertures 124 and 126 have identical geometries. In some embodiments, the first and second image sensor apertures 124 and 126 remove aberrations from the reflected light prior to impingement on the surface of the image sensor 110.

Figure 4:
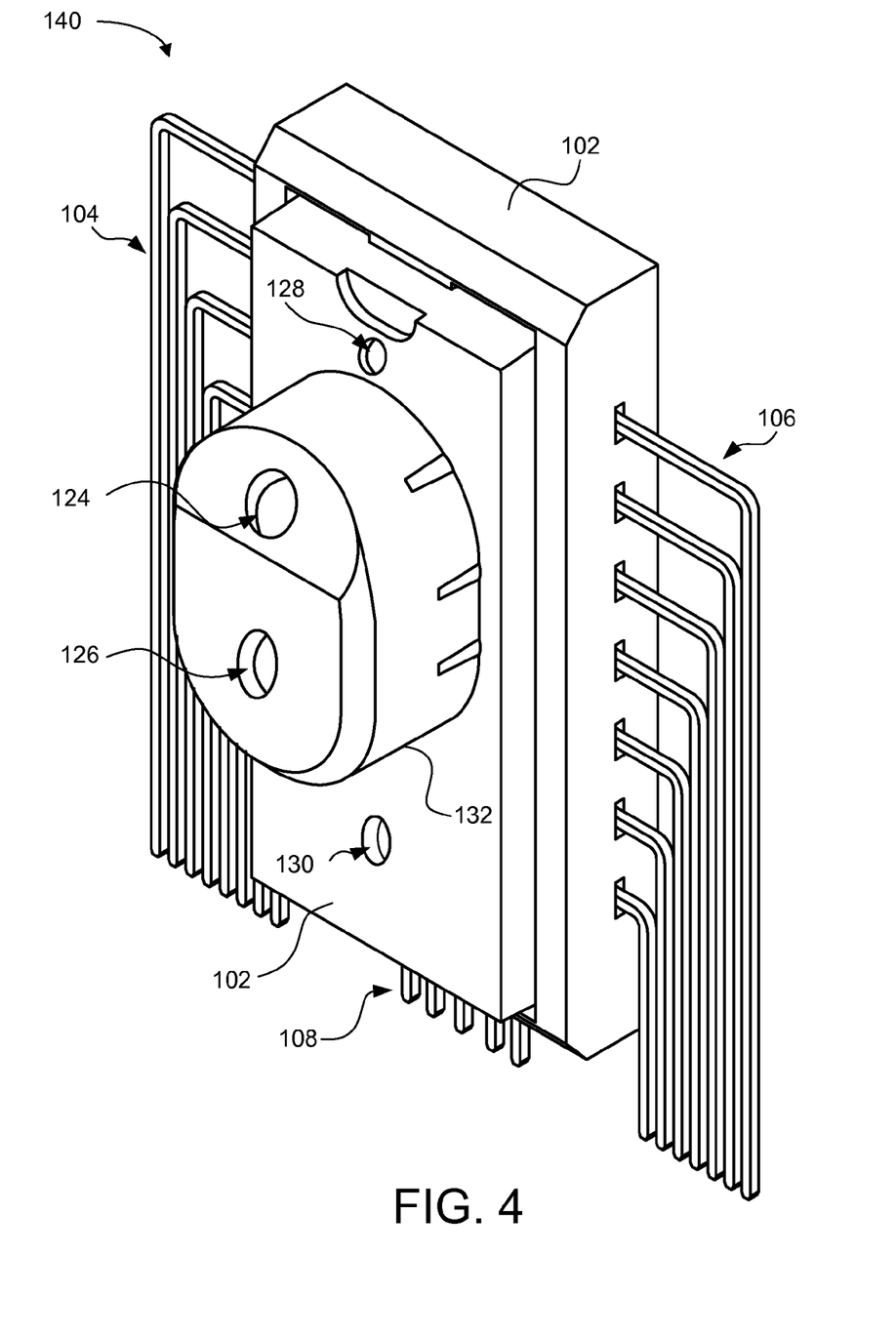
FIG. 4 depicts a perspective view of the multiple input optical navigation system of FIG. 3.

FIG. 4 depicts a perspective view of the multiple input optical navigation system 140 of FIG. 3. The illustrated embodiment includes many of the same components and features of FIG. 3, and similar numbers denote similar elements. The perspective view of FIG. 4 provides an illustration to convey some of the characteristics of the raised structure 132. The raised structure 132 may be a raised portion of the aperture plate 122 that is raised some amount from the rest of the aperture plate 122. The raised structure 132 may enclose the image sensor 110 on the PCB 102, as described above. In one embodiment, the raised structure 132 may have an elliptical geometry. In other embodiments, the raised structure 132 may have a circular, semi-circular, rectangular, or other geometry. Other embodiments may include other sizes and shapes for the raised structure 132. The raised structure 132 may enclose the first and second image sensor apertures 124 and 126. In the depicted embodiment, the portion of the raised structure 132 that includes the first image sensor aperture 124 may be oriented at some non-zero angle relative to the PCB 102 and the rest of the aperture plate 122. The portion of the raised structure 132 that includes the first image sensor aperture 124 may be oriented at an angle to be substantially perpendicular to the path of travel of the light passing through the first image sensor aperture 124. Other embodiments may implement, for example, rounded surfaces, rather than flat, angled surfaces.

Figure 5:
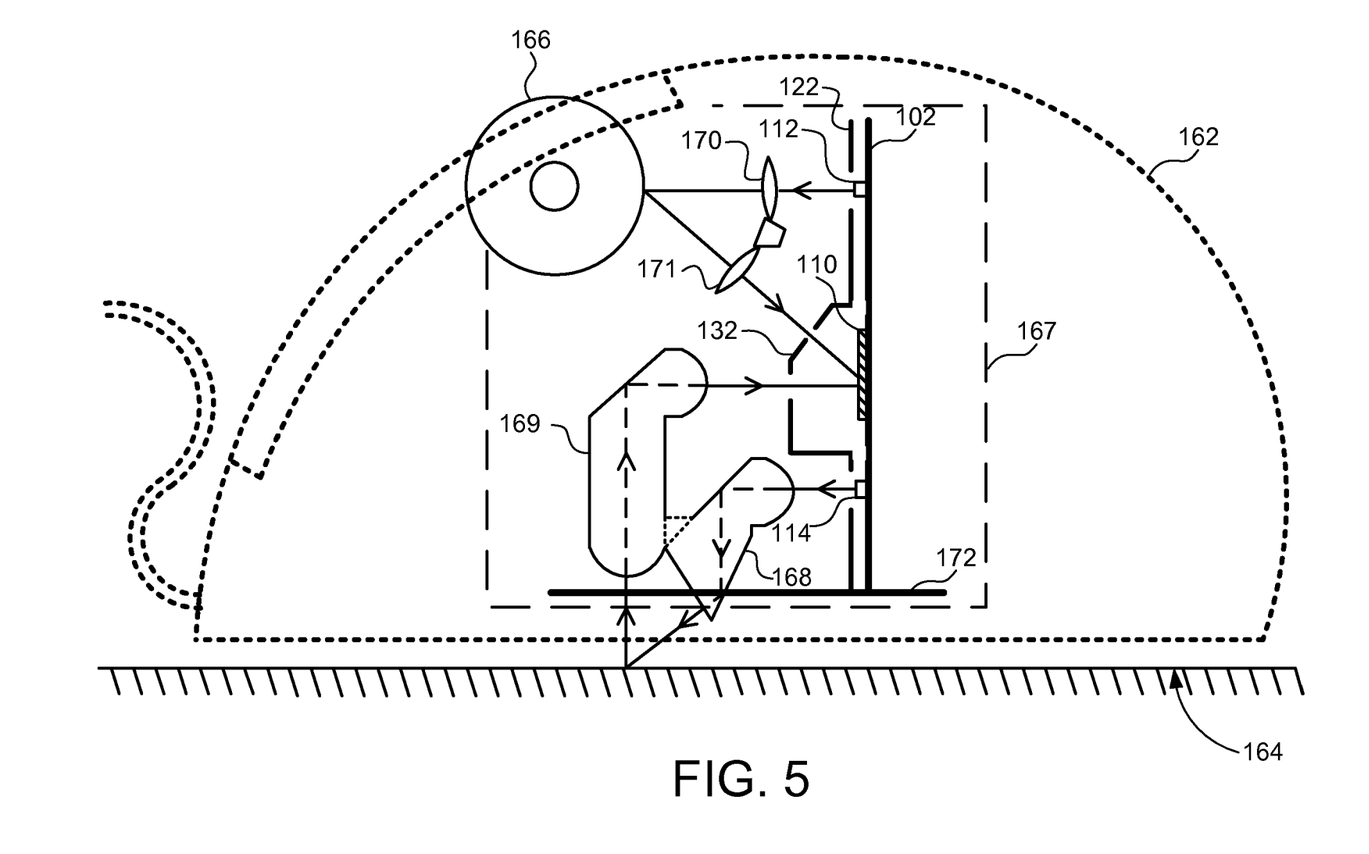
FIG. 5 depicts a schematic diagram of one embodiment of an optical mouse with the multiple input optical navigation system of FIG. 3.

FIG. 5 depicts a schematic diagram of one embodiment of an optical mouse 162 with the multiple input optical navigation system of FIG. 3. The illustrated optical mouse 162 operates relative to a contact navigation surface 164. In some embodiments, the contact navigation surface 164 may be, for example, a desktop or mouse pad. In some embodiments, the mouse 162 includes a scroll wheel 166 to serve as a tactile interface device. The optical mouse 162 also may include other types of tactile interface devices such as buttons, touch pads, track balls, and so forth. The depicted optical mouse 162 also includes a lens system 167. The lens system 167 includes the PCB 102 and the aperture plate 122. The PCB 102 includes the first and second light sources 112 and 114. The PCB 102 also includes the image sensor 110. The PCB 102 may be mounted substantially vertical with reference to the depicted contact navigation surface 164. The aperture plate 122 includes the raised structure 132. The aperture plate 122 may be mounted to the PCB 102 substantially parallel to the PCB 102 so that the aperture plate 122 is also perpendicular with respect to the depicted contact navigation surface 164.

The lens system 167 also includes a first illumination lens 170 and a first imaging lens 171. The first illumination lens 170 is aligned to direct light from the first light source 112 to the scroll wheel 166. The first imaging lens 171 is aligned between the scroll wheel 166 and the image sensor 110 to direct reflected light from the scroll wheel 166 to the image sensor 110. The first illumination and imaging lenses 170 and 171 may have properties to apply one or more optical effects (e.g. magnification, collimation, etc.) to the light from the first light source 112 and the reflected light from the scroll wheel 166. In some embodiments, the first illumination and imaging lenses 170 and 171 may be combined into a single lens structure.

The lens system 167 also includes a second illumination lens 168 and a second imaging lens 169. The second illumination lens 168 is aligned to direct light from the second light source 114 to the contact navigation surface 164. The second imaging lens 169 is aligned to direct reflected light from the contact navigation surface 164 to the image sensor 110. The second illumination and imaging lenses 168 and 169 may have properties to apply one or more optical effects (e.g. magnification, collimation, etc.) to the light from the second light source 114 and the reflected light from the contact navigation surface 164. In some embodiments, the second illumination lens 168 reflects the light from the second light source 114 through total internal reflection to direct the light to the contact navigation surface 164. In other embodiments, the second imaging lens 169 reflects the reflected light from the contact navigation surface 164 through total internal reflection to direct the reflected light to the image sensor 110. In some embodiments, the second illumination and imaging lenses 168 and 169 may be combined into a single lens structure (as indicated by the dashed lines between the second illumination and imaging lenses 168 and 169).

In some embodiments, one or more of the first illumination lens 170, the first imaging lens 171, the second illumination lens 168, and the second imaging lens 169 may be enclosed by the raised structure 132 of the aperture plate 122. In other embodiments, one or more of the lenses may be integrated within the aperture plate 122. Alternatively, one or more of the lenses 168-171 may be mounted outside of the aperture plate 122.

The lens system 167 also includes a second PCB 172. In some embodiments, the second PCB 172 may serve as a reference for mounting the lens system 167 within the optical mouse 162. In the illustrated embodiment, the second PCB 172 is mounted substantially horizontal and parallel to the illustrated contact navigation surface 164. In some embodiments, the PCB 102 is physically mounted and electrically connected directly to the second PCB 172. In some embodiments, the image sensor 110 is mounted to the PCB 102 and is oriented approximately perpendicular to the second PCB 172.

In some embodiments, the optical mouse 162 operates in multiple imaging modes, including a tactile interface device imaging mode and a contact navigation surface imaging mode. In some embodiments of the tactile interface device imaging mode, the first light source 112 is active and generates light which is directed through the first light source aperture 128. The light is then directed to the scroll wheel 166 or another tactile interface device via the first illumination lens 170. The reflected light from the scroll wheel 166 is then directed through the first image sensor aperture 124 via the first imaging lens 171. The reflected light then impinges on the image sensor 110. In some embodiments, the image sensor 110 is a complimentary metal-oxide semiconductor (CMOS) class sensor to convert the reflected light pattern to electrical navigation signals.

In some embodiments, as the tactile interface device or scroll wheel 166 is moved or changes relative position, the images received by the image sensor 110 are compared and changes in the sequential images are indicative of a navigational direction.

In an embodiment of the contact navigation surface imaging mode, the second light source 114 is active and generates light which radiates through the second light source aperture 130. The light is then directed by the second illumination lens 169 through total internal reflection to the contact navigation surface 164. The reflected light from the contact navigation surface 164 is then collected by the second imaging lens 168 and directed through total internal reflection through the second image sensor aperture 126 to impinge on the surface of the image sensor 110. The image sensor 110 then converts the reflected light pattern to electrical navigation signals.

As the contact navigation surface 164 moves relative to the optical mouse 162, the images received by the image sensor 110 are compared and changes in the sequential images are indicative of a navigational direction in multiple dimensions.

It should be noted that although the contact navigation surface 164 is described herein to be a contact surface, the optical mouse 162 or another device incorporating the lens system 167 is not required to be in contact with the contact navigation surface 164 to function as described. The lens system 167 need only be within an operating threshold for the device. Thus, some embodiments of the lens system 167 may be implemented in an optical navigation device which operates in a free-space navigation mode or another navigation mode.

Moreover, although the above description includes tactile interface imaging and contact navigation surface imaging modes, other embodiments include other modes and navigation channels. For example, one embodiment of the invention may include a free-space navigation channel to image to the same image sensor 110 when active in a free-space navigation imaging mode. Other embodiments may include other types of navigation and imaging modes.

Figure 6:
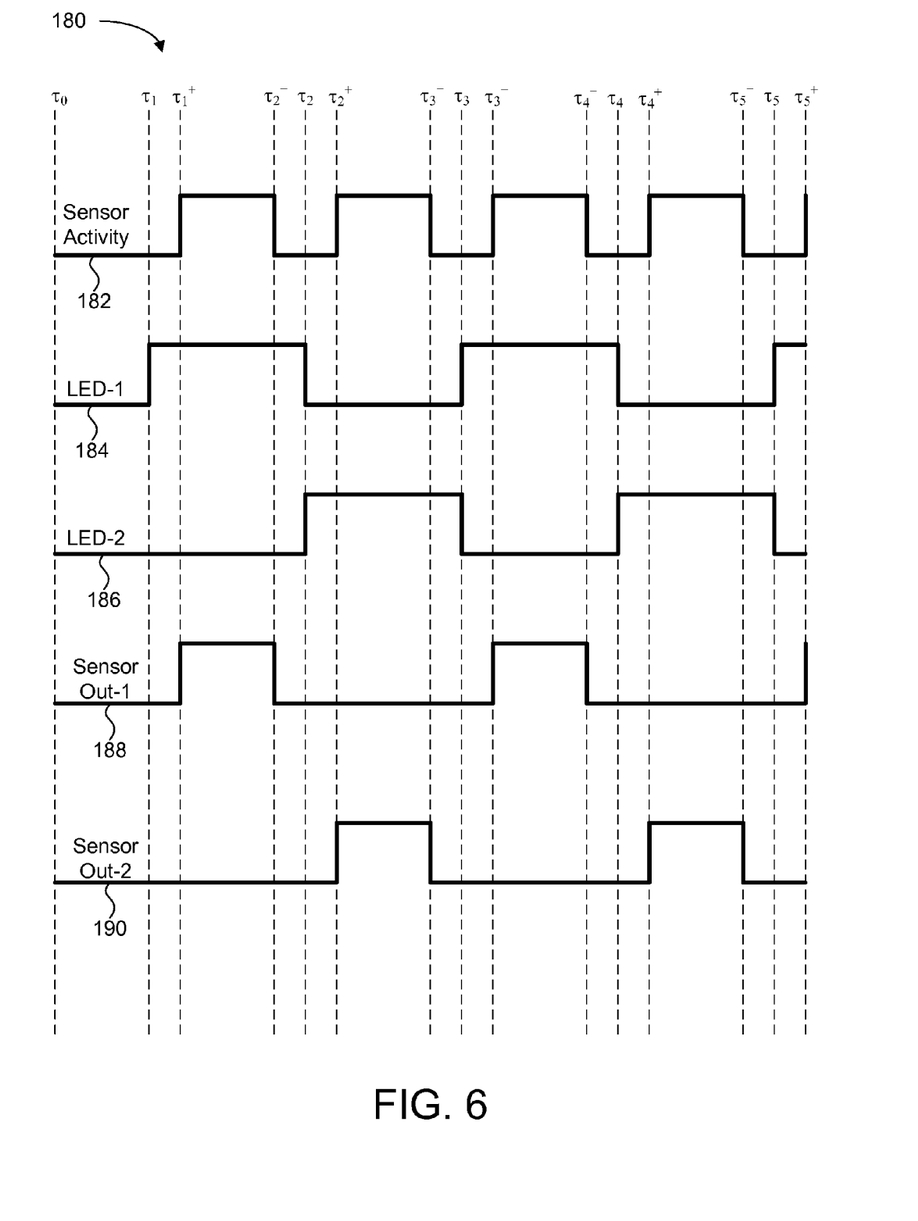
FIG. 6 depicts a timing diagram for one embodiment of the multiple input optical navigation system of FIG. 3.

FIG. 6 depicts a timing diagram 180 for one embodiment of the multiple input optical navigation system 140 of FIG. 3. The illustrated timing diagram 180 includes timing signals for a sensor acquisition signal 182, a first LED driver signal 184, a second LED driver signal 186, a first sensor output signal 188, and a second sensor output signal 190. At time $\tau_0$, the timing signals are at inactive states. At $\tau_1$, the first LED driver signal 184 indicates that the first LED is activated and is the only active driver signal (i.e. the second LED is not active). At $\tau_1^+$, the sensor acquisition signal 182 activates the image sensor to produce the first sensor output signal 188 that corresponds to the activity of the first LED. At $\tau_2^-$, the image sensor acquisition signal 182 goes inactive, terminating the first sensor output signal 188. The first LED driver signal 184 remains in the active state. At $\tau_2$, the first LED driver signal 184 goes inactive and the second LED driver signal 186 indicates that the second LED is activated. At $\tau_2^+$, the second LED driver signal 186 remains in the active state and the sensor acquisition signal 182 activates which corresponds to a second sensor output signal 190, which further corresponds to the second LED driver signal 186. At $\tau_3^-$ the image sensor acquisition signal 182 deactivates, terminating the second sensor output signal 190. At $\tau_3$ the behavior of each component is repeated just as described above, starting at $\tau_1$.

Figure 7:
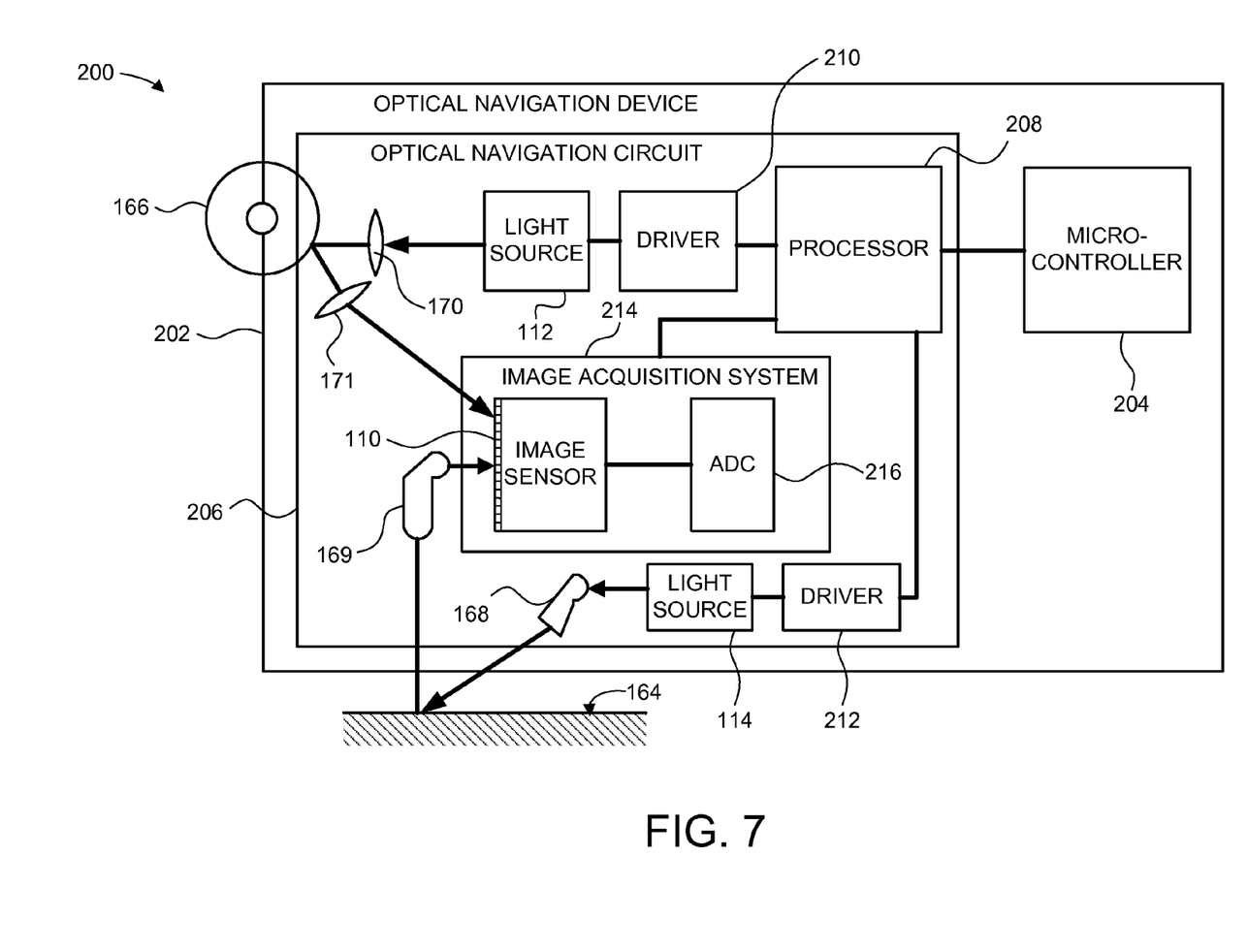
FIG. 7 depicts a schematic diagram of another embodiment of an optical navigation device with the multiple input optical navigation system of FIG. 3.

FIG. 7 depicts a schematic diagram of another embodiment of an optical navigation device 200 with the multiple input optical navigation system of FIG. 3. The illustrated optical navigation device 202 operates relative to the contact navigation surface 164. In one embodiment, the optical navigation device 202 is an optical computer mouse. The optical navigation device 202 includes a scroll wheel 166 although other embodiments may include other types of tactile interface devices. The optical navigation device 202 also includes a micro-controller 204 and an optical navigation circuit 206. In one embodiment, the microcontroller 204 implements a variety of functions, including transmitting data to and receiving data from a host computer system (not shown). The optical navigation circuit 206 includes a processor 208.

The processor is coupled to a first driver 210 and a second driver 212. The first driver 210 is coupled to a first light source 112. The second driver 212 is coupled to a second light source 114. The first driver 210 activates and deactivates the first light source 112. The second driver 212 activates and deactivates the second light source 114. The processor 208 may control illumination timing schedules, or schemes, of the first and second light sources 112 and 114. In one embodiment, the first light source 112 is aligned to direct light to a first illumination lens 170. The first illumination lens 170 is configured to direct the light to the scroll wheel 166. The light reflected from the scroll wheel 166 is directed by a first imaging lens 171 to an image acquisition system 214. The second light source 114 may be aligned with a second illumination lens 168 to direct light to the contact navigation surface 164. The light reflected from the contact navigation surface 164 is collected by a second imaging lens 169. The light is directed from the contact navigation surface 164 to the image acquisition system 214 via the second imaging lens 169.

In one embodiment, the image acquisition system 214 is coupled to the processor 208. The image acquisition system 214 includes an image sensor 110 and an analog-to-digital converter (ADC) 216. The image sensor 110 may be aligned to receive the reflected light from both the first and second imaging lenses 171 and 169. In one embodiment, the image sensor 110 generates separate navigation signals based on the detected incident light. The first of the separate navigation signals may include motion data from the contact navigation surface 164. The second of the separate navigation signals may include motion data from the scroll wheel 166. The ADC 216 converts the navigation signal from the image sensor 110 and transmits the signals to the processor 208. The processor 208 transmits the signals to the micro-controller 204.

In one embodiment, the processor 208 generates one or more control signals to control the activation of the first and second light sources 112 and 114 through the corresponding drivers 210 and 212. In one embodiment, the processor 208 activates the first light source 112 through the first driver 210, and the image sensor 110 detects the incident light and generates a navigation signal based on the movement of the scroll wheel 166. In another embodiment the processor 208 activates the second light source 114 through the second driver 212, and the image sensor 110 detects the incident light and generates a navigation signal corresponding to the movement of the contact navigation surface 164 relative to the optical navigation device 202. In some embodiments, the processor 208 activates the light sources 112 and 114 intermittently according to a timing scheme. In one embodiment, the light sources 112 and 114 are activated exclusive of one another. In other words, if the first light source 112 is active, the second light source 114 is inactive.

In some embodiments, the timing scheme activates the light sources 112 and 114 in an alternating pattern. In one embodiment, the alternating pattern changes at every interval of one (e.g., 1-2-1-2-1-2, where 1 is indicative of the first light source 112 and 2 is indicative of the second light source 114). In another embodiment, the alternating pattern groups the signals in groups of two or more (e.g., 1-1-1-2-2-2). In another embodiment, the timing scheme checks for relative movement at the scroll wheel 166 (e.g., 2-2-2-1-2-2-2-1-2-2-2). In another embodiment, the image sensor 110 is calibrated with the timing scheme to perform multiplexing to generate navigation images from the contact navigation surface 164 and the scroll wheel 166. In some embodiments, the sensor is calibrated to multiplex for more than two surfaces.

Figure 8:
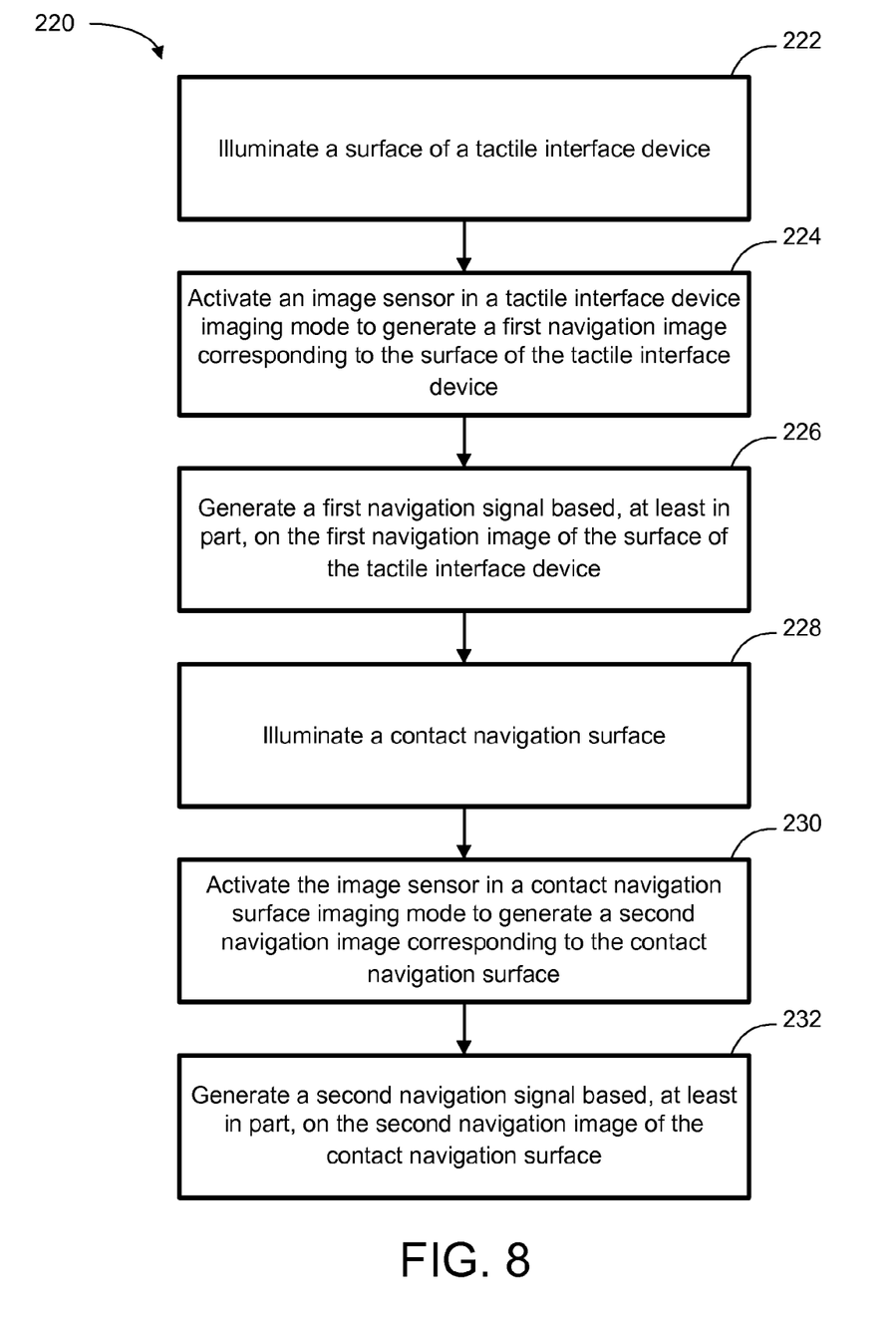
FIG. 8 depicts a flowchart diagram of one embodiment of a method for operating the optical navigation device of FIG. 7.

FIG. 8 depicts a flowchart diagram of one embodiment of a method 220 for operating the optical navigation device of FIG. 7. Although the method 220 is described in conjunction with the multiple input optical navigation system described above, other embodiments of the method 250 may be implemented with other optical navigation systems and/or other components thereof.

Other embodiments of the method 220 may implement fewer or more operations. In particular, some embodiments of the method 220 facilitate implementation of any of the functions described above in relation to the multiple input optical navigation system or any of the components thereof.

At block 222, the first light source 112 illuminates the surface of the tactile interface device 166. At block 224, the processor 208 activates the image sensor 110 in a tactile interface device imaging mode to generate a first navigation image corresponding to the surface of the tactile interface device 166. At block 226, the image sensor 110 generates a first navigation signal based, at least in part, on the first navigation image of the surface of the tactile interface device 166. At block 228, the second light source 114 illuminates the contact navigation surface 164. At block 230, the processor 208 activates the image sensor 110 in a contact navigation surface imaging mode to generate a second navigation image corresponding to the contact navigation surface 164. At block 232, the image sensor 110 generates a second navigation signal based, at least in part, on the second navigation image of the contact navigation surface 164.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation system comprising:
   a tactile interface device to facilitate a navigation input;
   an image sensor with a common sensor surface to intermittently generate images of a surface of the tactile interface device and images of a contact navigation surface, wherein the image sensor is configured to generate during a first time period the images of the surface of the tactile interface device exclusive of the images of the contact navigation surface that are generated during a second time period; and
   a processor coupled to the image sensor, the processor to generate a first navigation signal based on the images of the tactile interface device and to generate a second navigation signal based on the images of the contact navigation surface.

2. The navigation system of claim 1, wherein the tactile interface device comprises a scroll wheel.

3. The navigation system of claim 1, further comprising:
   a first light source to illuminate the surface of the tactile interface device; and
   a second light source to illuminate the contact navigation surface.

4. The navigation system of claim 3, wherein the processor is configured to activate the first light source during operation in a tactile interface device imaging mode and to capture an image of the surface of the tactile interface device during the tactile interface device imaging mode.

5. The navigation system of claim 4, wherein the processor is configured to activate the second light source during operation in a contact navigation surface imaging mode and to capture an image of the contact navigation surface during the contact navigation surface imaging mode.

6. The navigation system of claim 4, further comprising an aperture plate to substantially cover the image sensor and the first and second light sources, wherein the aperture plate comprises:
- a first aperture approximately aligned with the first light source;
- a second aperture approximately aligned with the second light source;
- a third aperture approximately aligned with the image sensor to allow transmission of reflected light from the surface of the tactile interface device to impinge on the image sensor; and
- a fourth aperture approximately aligned with the image sensor to allow transmission of reflected light from the contact navigation surface to impinge on the image sensor.

7. The navigation system of claim 6, wherein at least one of the first, second, third, and fourth apertures comprises a light transmissive material.

8. The navigation system of claim 1, wherein the image sensor is mounted substantially perpendicular relative to the contact navigation surface.

9. The navigation system of claim 1, further comprising:
- a first illumination lens to direct light from a first light source to the surface of the tactile interface device;
- a first imaging lens to direct reflected light from the surface of the tactile interface device to the image sensor.

10. The navigation system of claim 9, further comprising:
- a second illumination lens to direct light from a second light source to the contact navigation surface; and
- a second imaging lens to direct reflected light from the contact navigation surface to the image sensor.

11. The navigation system of claim 1, wherein the processor is further configured to intermittently multiplex between the tactile interface device operation mode and the contact navigation surface imaging operation mode based, at least in part, on a timing scheme.

12. An apparatus comprising:
- a first light source to illuminate a surface of a tactile interface device;
- a second light source to illuminate a contact navigation surface;
- an image sensor with a common sensor surface to generate separate navigation images of the surface of the tactile interface device during a first time period and the contact navigation surface during a second time period; and
- a processor coupled to the image sensor, the processor to generate a first navigation signal based on the navigation images of the tactile interface device and to generate a second navigation signal based on the navigation images of the contact navigation surface.

13. The apparatus of claim 12, wherein the image sensor is mounted approximately between the first and second light sources.

14. The apparatus of claim 12, further comprising a first printed circuit board to mount the image sensor, wherein the image sensor is mounted substantially perpendicular relative to a second printed circuit board.

15. The apparatus of claim 12, wherein the processor is further configured to intermittently multiplex between a tactile interface device operation mode and a contact navigation surface imaging operation mode based, at least in part, on a timing scheme.

16. A method for multiple input navigation, the method comprising:
- illuminating a surface of a tactile interface device;
- activating an image sensor in a tactile interface device imaging mode to generate at a common sensor surface a first navigation image corresponding to the surface of the tactile interface device during a first time period;
- illuminating a contact navigation surface;
- activating the image sensor in a contact navigation surface imaging mode to generate at the common sensor surface a second navigation image corresponding to the contact navigation surface during a second time period.

17. The method of claim 16, further comprising generating a first navigation signal based, at least in part, on the first navigation image of the surface of the tactile interface device.

18. The method of claim 16, further comprising generating a second navigation signal based, at least in part, on the second navigation image of the contact navigation surface.

19. The method of claim 16, further comprising intermittently multiplexing between the tactile interface device imaging operation mode and the contact navigation surface imaging operation mode based, at least in part, on a timing scheme.

20. The method of claim 16, further comprising resetting the image sensor between the tactile interface device imaging operation mode and the contact navigation surface imaging operation mode.

* * * * *